United States Patent

Jha

[11] Patent Number: 5,905,466
[45] Date of Patent: *May 18, 1999

[54] TERRESTRIAL ANTENNAS FOR SATELLITE COMMUNICATION SYSTEM

[75] Inventor: Asu Ram Jha, Cerritos, Calif.

[73] Assignee: Teledesic LLC, Kirkland, Wash.

[*] Notice: This patent is subject to a terminal disclaimer.

[21] Appl. No.: 08/889,409

[22] Filed: Jul. 8, 1997

Related U.S. Application Data

[63] Continuation of application No. 07/984,609, Dec. 2, 1992, Pat. No. 5,560,788, which is a continuation-in-part of application No. 07/790,273, Nov. 8, 1991, abandoned.

[51] Int. Cl.[6] .............................. H01Q 1/38; H01Q 1/24
[52] U.S. Cl. .................... 343/700 MS; 343/702; 343/754
[58] Field of Search ............................ 343/700 MS, 702, 343/754, 778, 853; 342/371, 372, 373, 374, 375

[56] References Cited

U.S. PATENT DOCUMENTS

| | | | |
|---|---|---|---|
| 4,101,895 | 7/1978 | Jones, Jr. | 363/799 MS |
| 4,162,499 | 7/1979 | Jones, Jr. et al. | 343/700 MS |
| 4,605,932 | 8/1986 | Butscher et al. | 363/700 MS |
| 4,771,291 | 9/1988 | Lo et al. | 343/700 MS |
| 4,792,808 | 12/1988 | Hildebrand | 343/853 |
| 4,899,162 | 2/1990 | Bayetto et al. | 343/700 MS |
| 4,958,165 | 9/1990 | Axford et al. | 363/770 |
| 4,972,808 | 11/1990 | Hildebrand | 363/754 |
| 5,153,601 | 10/1992 | Milne | 363/754 |
| 5,243,358 | 9/1993 | Sanford et al. | 343/836 |
| 5,457,465 | 10/1995 | Collier et al. | 342/374 |
| 5,650,788 | 7/1997 | Jha | 343/700 MS |

FOREIGN PATENT DOCUMENTS

| | | |
|---|---|---|
| 0512487 | 11/1992 | European Pat. Off. . |
| 56-8395 | 1/1981 | Japan . |

OTHER PUBLICATIONS

European Patent Application No. 92304879.7, May 28, 1992, H. Iwasaki et al.

"Beamforming Devices and Feed Structures for a DBS Flat–Plate Antenna," S. Wakeling, BBC Research Department Report No. 12, 1989, pp. 1–12.

"Land Vehicle Antennas for Satellite Mobile Communications," H.A. Haddad et al., IEEE Globecom '85, Dec. 1985, pp. 1172–1176.

"Basic Theoretical Aspects of Spherical Phased Arrays," H.E. Schrank, Phased Array Antennas. Ed. A. Oliner et al., Artech Hse. Jun. '70, pp. 323–327.

(List continued on next page.)

*Primary Examiner*—Don Wong
*Assistant Examiner*—Tan Ho
*Attorney, Agent, or Firm*—Seed & Berry LLP

[57] ABSTRACT

Terrestrial antennas (10A, 10B, 10C and 10D) which are capable of transmitting and receiving radio signals directly to and from satellites in low Earth orbit are disclosed. The preferred embodiment of the invention employs circularly polarized, dual-frequency printed circuit antenna elements (136) measuring only a fraction of an inch in diameter. One embodiment (10A) includes an elevation array and an azimuth array which both reside on a trapezoidal, semi-conical housing that resembles a flattened pyramid. Both the top and the curved exterior of the pyramid support circular, slotted, printed circuit patches on their surfaces which bound individual radiating antenna elements (18). Since the entire antenna is only a few inches in diameter and is less than two inches high, it can be incorporated as an integral element of a telephone (T) or can be mounted at the end of a collapsible mast (CM). Other embodiments (10B, 10C, and 10D) of the invention employ hemispherical, cylindrical, and truncated hemispherical configurations. These unique antennas permit direct communication with satellites in low Earth orbit using the 20 and 30 GHz frequency bands. The antennas (10A, 10B, 10C and 10D) and their associated circuitry are sufficiently powerful to provide dependable service virtually anywhere on land, sea or in the air.

5 Claims, 10 Drawing Sheets

OTHER PUBLICATIONS

"A 20/30 GHz Personal Access Satellite System Design," P. Estabrook et al., *IEEE Int'l Conference on Communications*, Jun. 1989, pp. 0126–0222.

"MAGNAPhone" brochure, Magnavox Nav–Com. Inc. (Date is not provided).

"Desert Storm Demand Buffets Satellite–Phone Firm," M. Robichaux & G. Fuchsberg, Feb. 1, 1991, B2.

"Microstrip Patch Array with Multiple Beams," P.S. Hall & S.J. Vetterlein 19$^{th}$ European Microwave Conference, Sep. 1989, pp. 343–348.

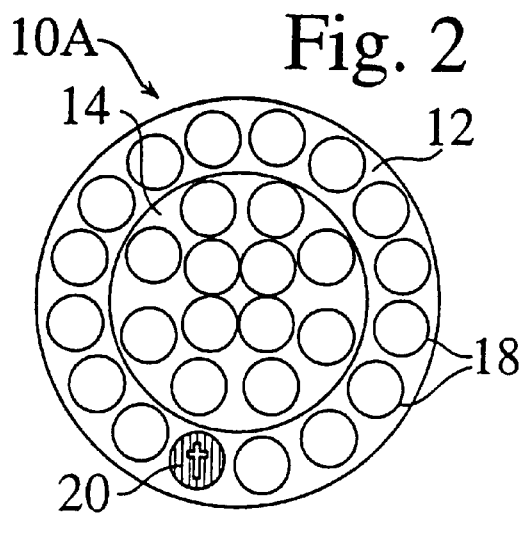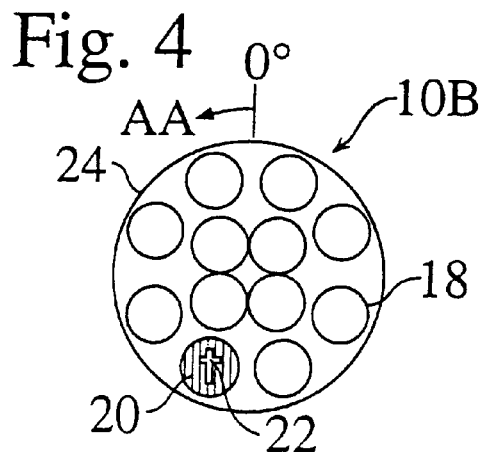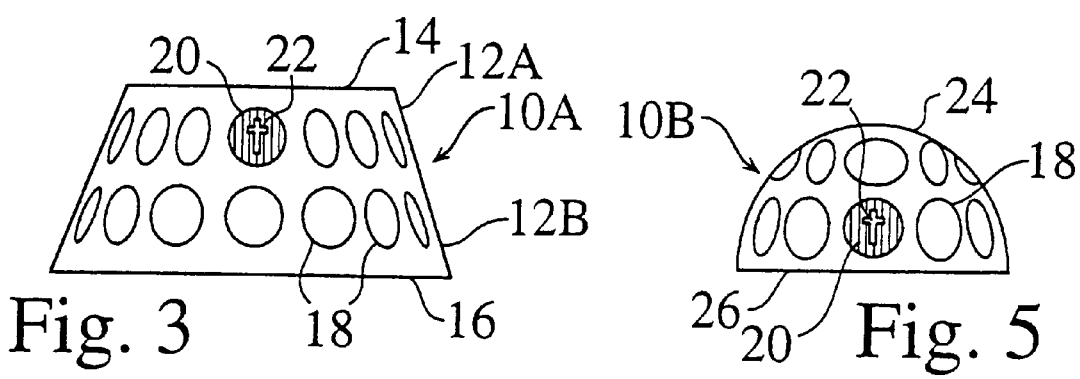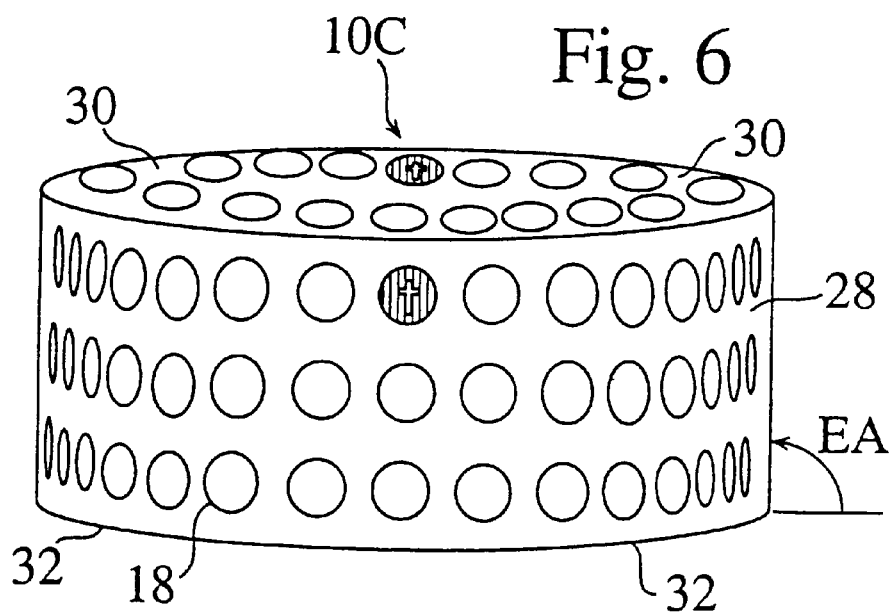

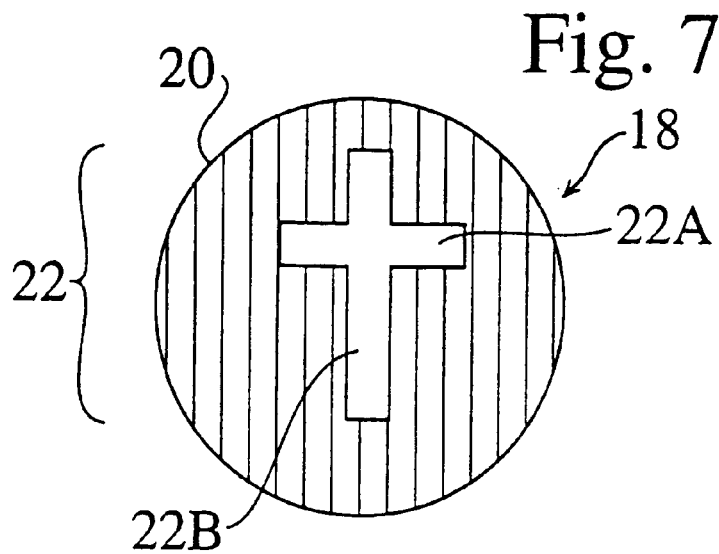
Fig. 7
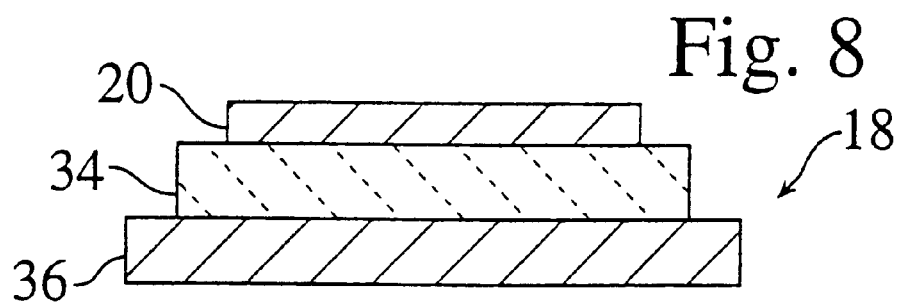
Fig. 8
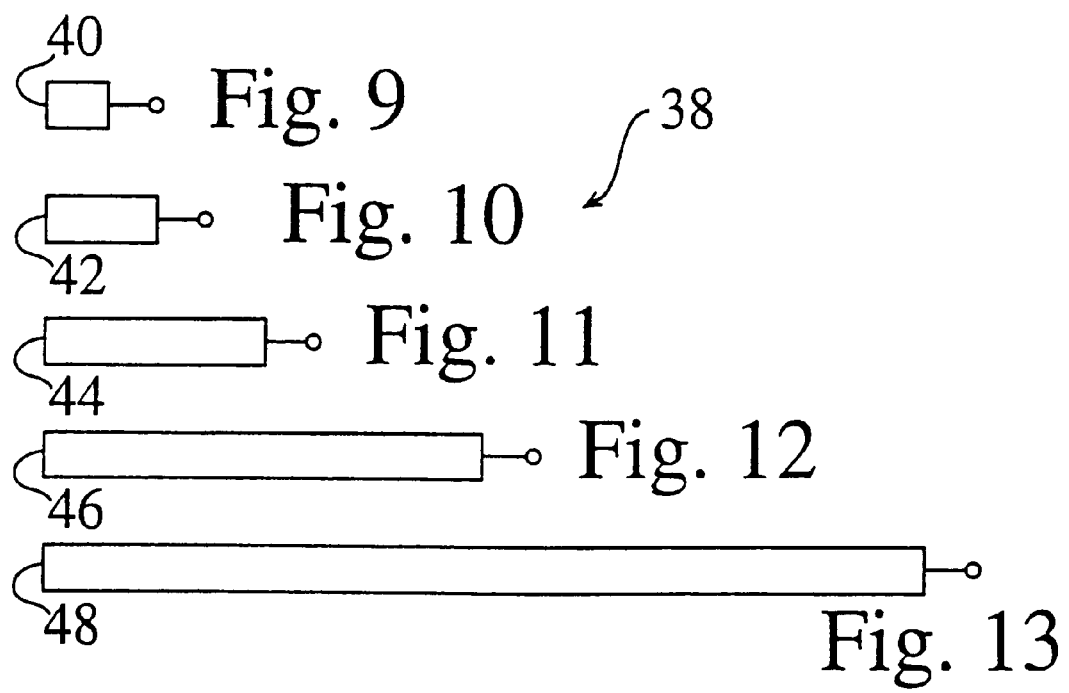
Fig. 9
Fig. 10
Fig. 11
Fig. 12
Fig. 13

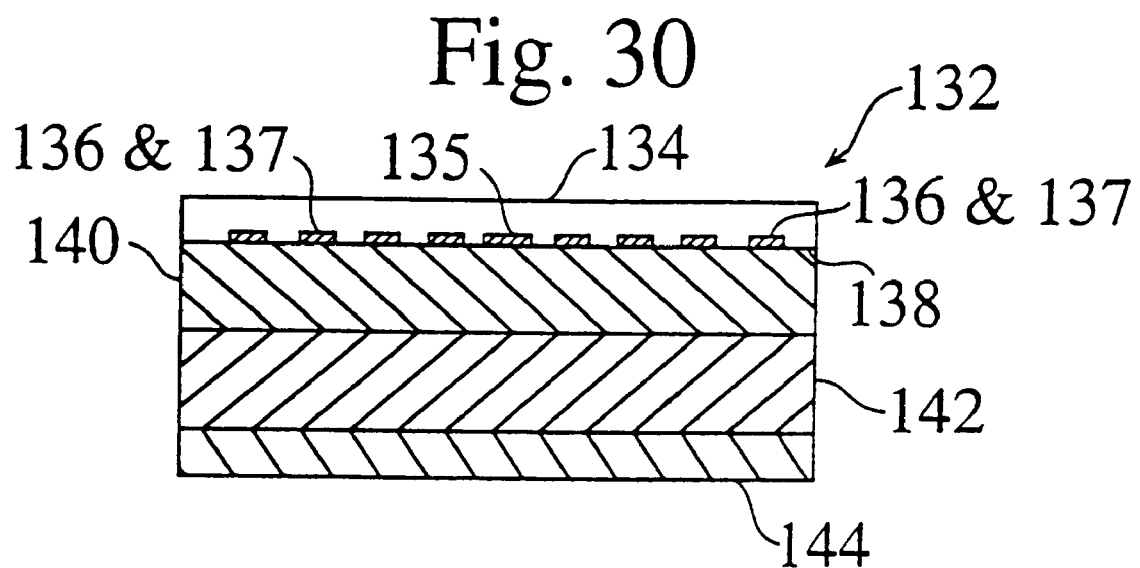
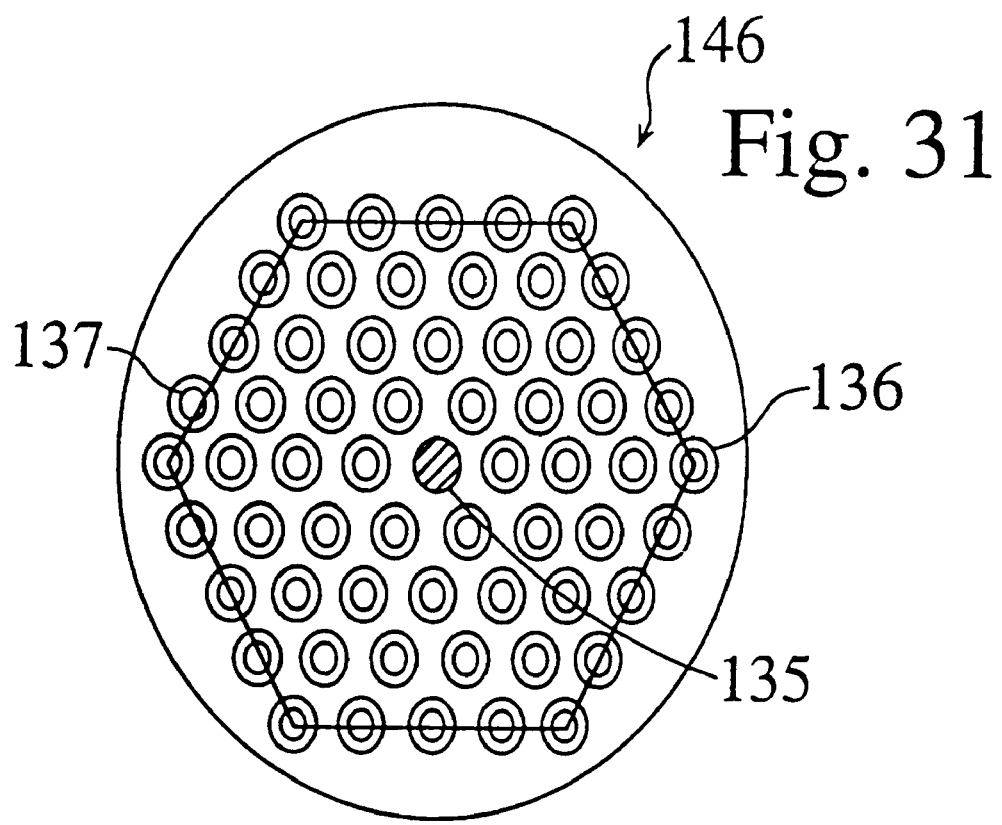

TERRESTRIAL ANTENNAS FOR SATELLITE COMMUNICATION SYSTEM

CLAIM FOR PRIORITY

The present application is a continuation of U.S. application Ser. No. 07/984,609, filed on Dec. 2, 1992, now U.S. Pat. No. 5,560,788, which is a continuation-in-part of U.S. application Ser. No. 07/790,273, filed Nov. 8, 1991, now abandoned.

CROSS-REFERENCES TO RELATED PATENT APPLICATIONS

The present patent application is related to the following commonly-owned and commonly-assigned pending patent applications:

*Satellite Communication System* by Edward Fenton Tuck et al., filed on Oct. 28, 1991 and assigned U.S. Ser. No. 07/783,754;

*Method of Conducting a Telecommunications Business Implemented on a Computer* by Edward Fenton Tuck, filed on Jun. 6, 1992 and assigned U.S. Ser. No. 07/895,295;

*Switching Methods for Satellite Communication System* by David Palmer Patterson and Moshe Lerner Liron, filed on Nov. 8, 1992 and assigned U.S. Ser. No. 07/790,805;

*Beam Compensation Methods for Satellite Communication System* by David Palmer Patterson and Mark Alan Sturza, filed on Nov. 8, 1992 and assigned U.S. Ser. No. 07/790,318;

*Spacecraft Antennas & Beam Steering Methods for Satellite Communication System* by Douglas Gene Lockie et al., filed on Oct. 28, 1992 and assigned U.S. Ser. No. 07/967,988;

*Spacecraft Intersatellite Link for Satellite Communication System* by Douglas Gene Lockie et al., filed on Jul. 16, 1992 and assigned U.S. Ser. No. 07/915,172; and

*Spacecraft Designs for Satellite Communication System* by James R. Stuart and David Palmer Patterson, filed on Aug. 18, 1992 and assigned U.S. Ser. No. 07/931,625.

The specifications of the patent applications listed above are hereby incorporated by reference.

FIELD OF THE INVENTION

The present invention relates to the field of satellite communications. More particularly, this invention provides a compact, electronically steerable, phased-array antenna for use with a portable, hand-held telephone.

BACKGROUND OF THE INVENTION

While cellular phones now offer convenient service for mobile and portable telephones that was uncommon only a decade ago, currently available cellular service is limited in scope, and is often unreliable and subject to interference and interruption. Conventional cellular systems utilize a network of land-based antenna towers called "cell sites," which send and receive microwave signals that link customers using mobile phones in their vehicles or hand-held portable units. Since cell sites are only found in densely populated areas, cellular service is severely limited. Communication links in this network are frequently impaired when a customer travels from one geographical cell to another, or when hills or buildings occlude the line-of-sight pathway of the microwave radiation which carries the signals.

Recent attempts to overcome these shortcomings of widely-available cellular service have met with mixed results. Elaborate and heavy transportable phone systems which include a large satellite dish for communication directly with geosynchronous satellites have recently become commercially available. These systems are bulky, require large power supplies, and are extremely expensive.

No single public communications network is presently capable of offering continuous world-wide service to a customer using a mobile or portable phone without the use of costly and large antenna systems. The overwhelming majority of commercial spacecraft and transponders which are currently operating do not generally possess the power capacity to communicate directly with a hand-held telephone unless it is attached to an antenna dish that measures from one to several feet in diameter. The problem of providing an economically viable world-wide network for voice, data, and video which can be used by mobile and portable phones with antennas that are matched in practical proportion to the size of the phone has presented a major challenge to the communications business. The development of an easy-to-use, hand-held telephone having its own power supply and a practical antenna suitable for direct communication to a satellite network would constitute a major technological advance and would satisfy a long felt need within the electronics and telephone industries.

SUMMARY OF THE INVENTION

The *Terrestrial Antennas* disclosed and claimed in this patent application solve the problems encountered in previous attempts to construct reliable and effective hand-held telephones using built-in, practical antennas that can communicate directly with spacecraft in orbit. The present invention comprises a novel, compact, multi-element, electronically steerable phased array antenna. The various embodiments of the invention utilize active phased array designs which use printed circuit antenna and MMIC technology. These designs employ circularly polarized, dual-frequency printed circuit antenna elements measuring only a fraction of an inch in diameter. One of the embodiments of the invention includes an elevation array and an azimuth array which both reside on a trapezoidal, semi-conical housing that resembles a flattened pyramid. Both the top and the curved exterior of the pyramid support circular, slotted, printed circuit patches on their surfaces which bound individual radiating antenna elements. Since the entire antenna is only a few inches in diameter and less than two inches high, it can be incorporated as an integral element of the phone or can be mounted at the end of a retractable mast. Other embodiments of the invention employ hemispherical, cylindrical and truncated hemispherical configurations. These unique antennas permit direct communication with satellites in low Earth orbit using the 20 and 30 GHz frequency bands. The antenna and its associated circuitry are sufficiently powerful to provide dependable service virtually anywhere on land, sea or in the air. The present invention also includes novel printed circuit low-loss delay lines that are employed to provide required phase shifts to steer the beams radiated by the hand-held antenna.

The present invention may be used as a vital element of a novel *Satellite Communication System*, which is referred to above. The *Terrestrial Antennas* described and claimed in this patent application will enable hand-held telephone designers to overcome the difficulties which plague conventional cellular phones. The present invention will offer an entirely new class of mobile and portable communication that will revolutionize the telephone industry.

An appreciation of other aims and objectives of the present invention and a more complete and comprehensive understanding of this invention may be achieved by studying the following description of preferred embodiments and by referring to the accompanying drawings.

A BRIEF DESCRIPTION OF THE DRAWINGS

FIG. 1 is a perspective view of a hand-held portable phone that includes the present invention. In one of the preferred embodiments, a hemispherical microwave antenna extends from the body of the phone on a collapsible mast.

FIGS. 2 and 3 supply top and side views of a generally trapezoidal, semi-conical embodiment of the invention.

FIGS. 4 and 5 present top and side views of a hemispherical embodiment of the invention.

FIG. 6 is a perspective view of an embodiment of the invention which takes the shape of a right circular cylinder.

FIGS. 7 and 8 provide enlarged illustrations of one of the circular antenna elements. FIG. 7 is a top view and FIG. 8 is a cross-sectional view.

FIGS. 9, 10, 11, 12 and 13 collectively furnish a schematic representation of a five bit, time delay phase shifter.

Figure 22:
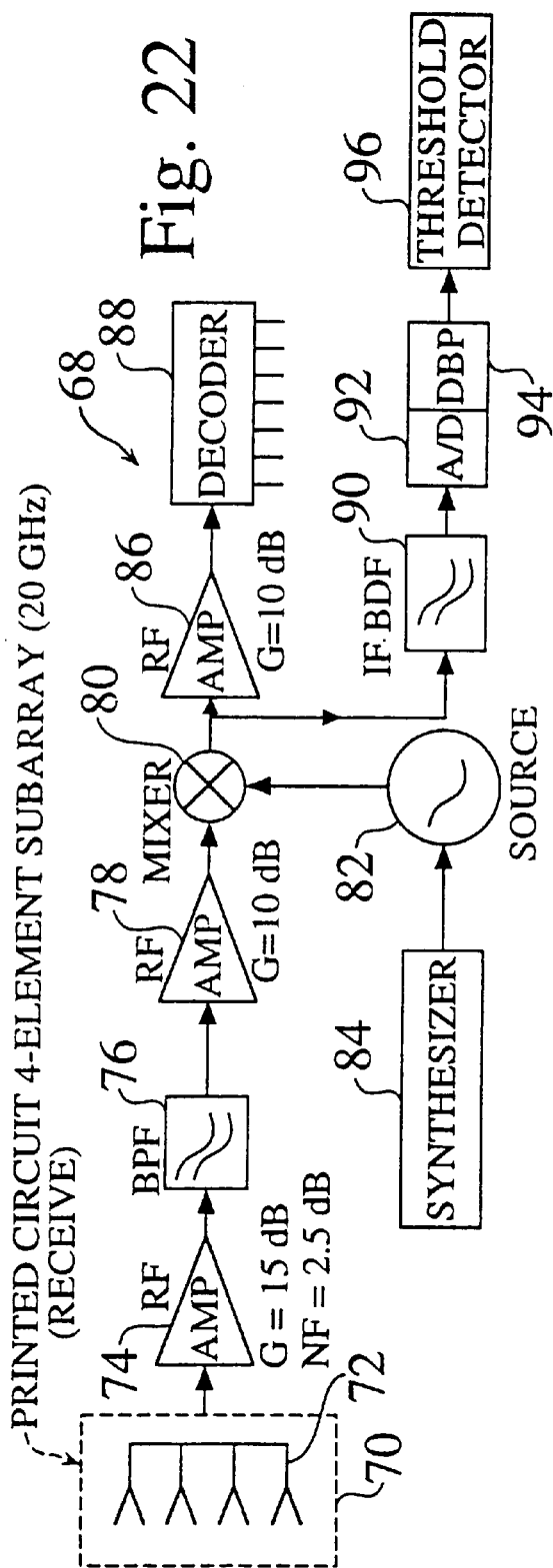
Figure 23:
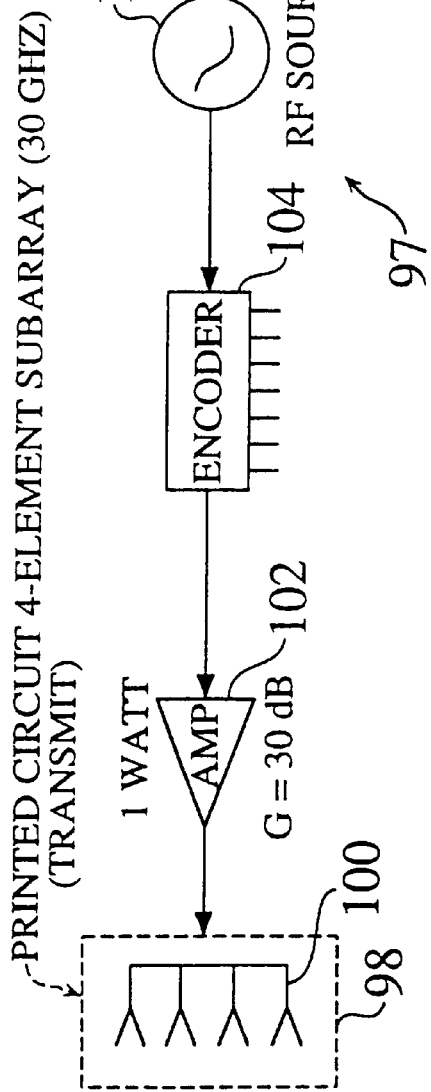

FIGS. 22 and 23 reveal schematic diagrams of the receive and transmit circuits utilized in one of the several embodiments of the invention.

Figure 24:
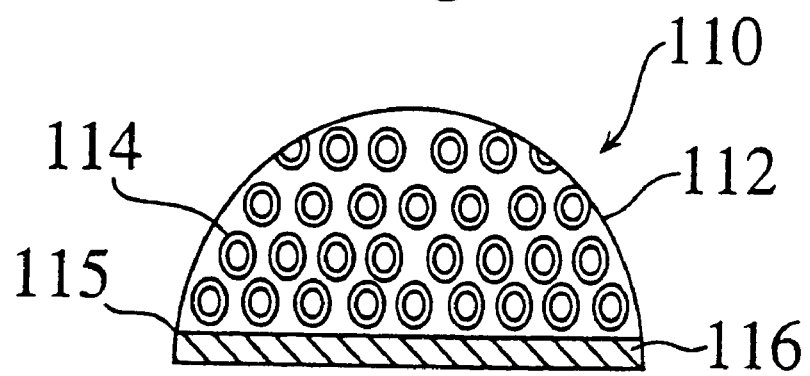
Figure 25:
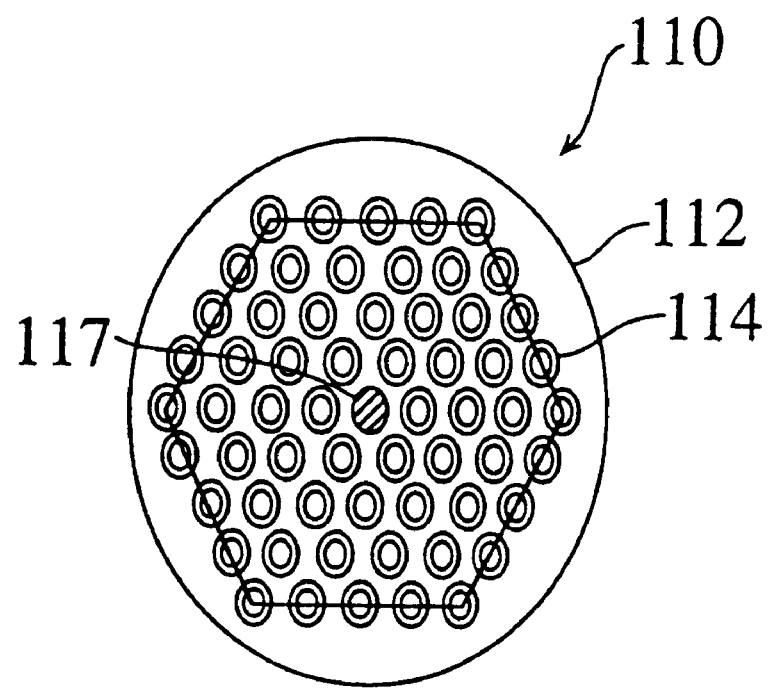

FIGS. 24 and 25 depict elevational and plan views of one of the embodiments of the invention which incorporates a hexagonal lattice of radiating elements.

Figure 26:
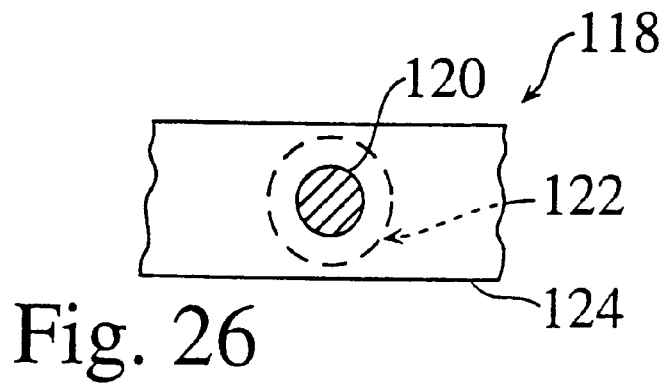
Figure 27:
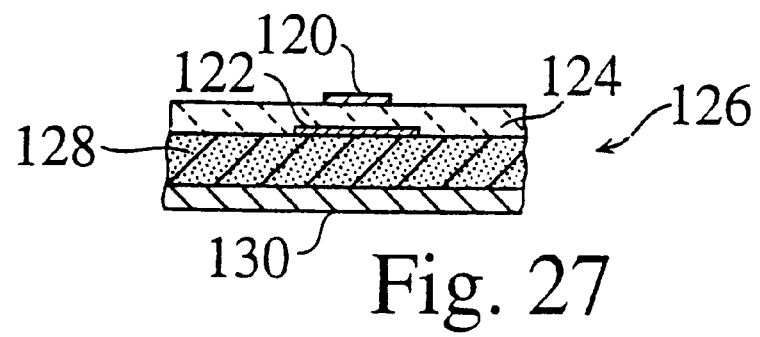

FIGS. 26 and 27 show plan and sectional views of dual-frequency, stacked element, microstrip printed circuit antennas.

Figure 28:
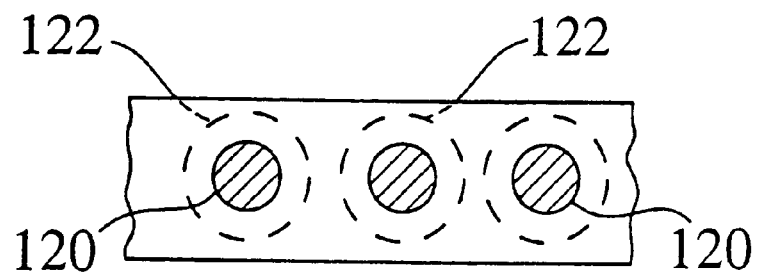
Figure 29:
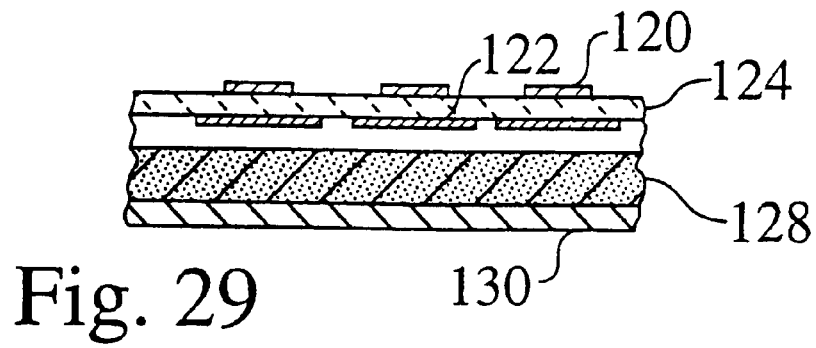

FIGS. 28 and 29 show plan and sectional views of dual-frequency, co-located, interleaved, microstrip printed circuit antennas.

FIGS. 30 and 31 show cross-sectional and plan views of 20/30 GHz, 61-element, electronically steerable, phased array antennas incorporating a hexagonal lattice.

Figure 32:
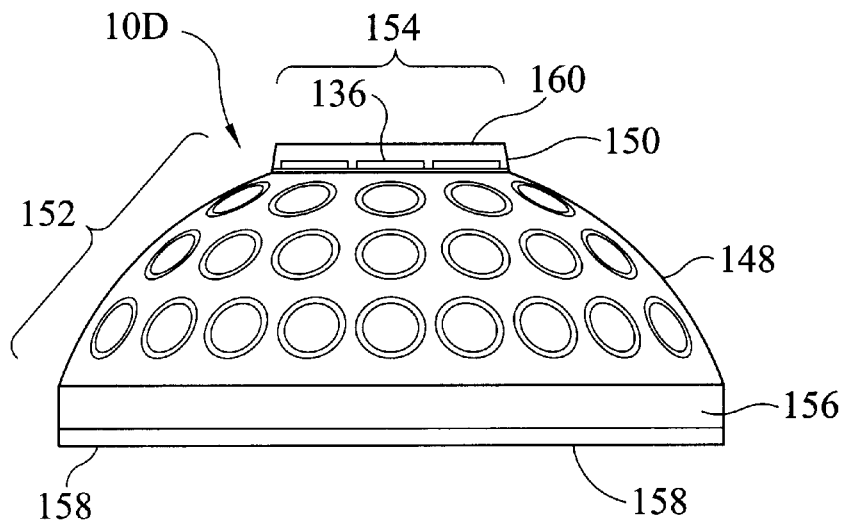
Figure 33:
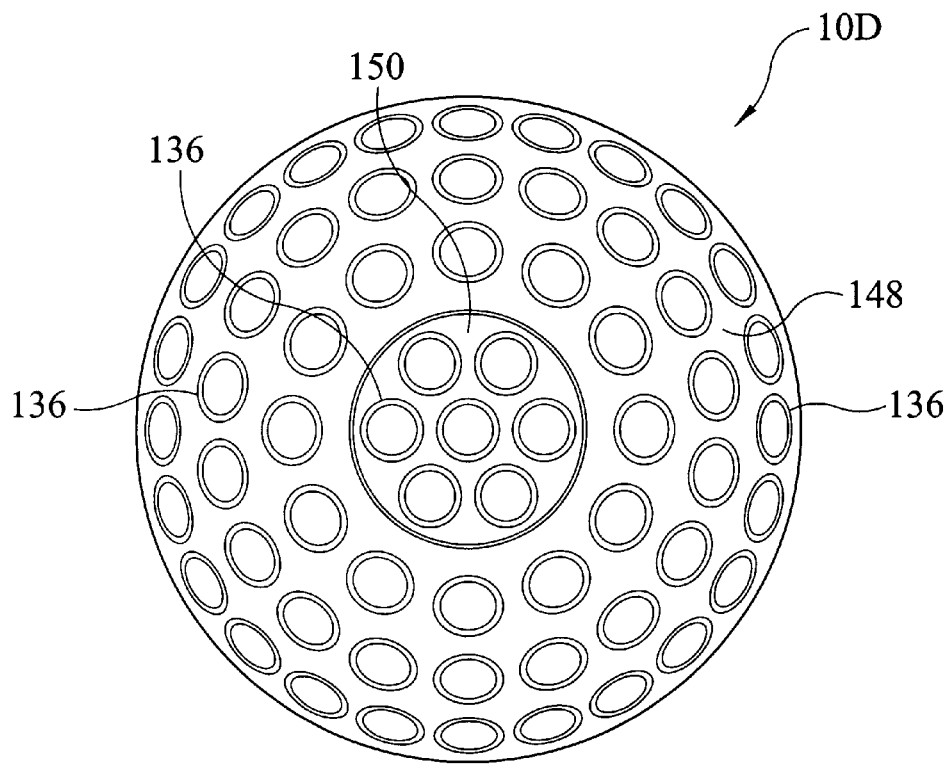

FIGS. 32 and 33 reveal another alternative embodiment of the present invention comprising a truncated hemispherical configuration.

A DETAILED DESCRIPTION OF A PREFERRED EMBODIMENT

Figure 1:
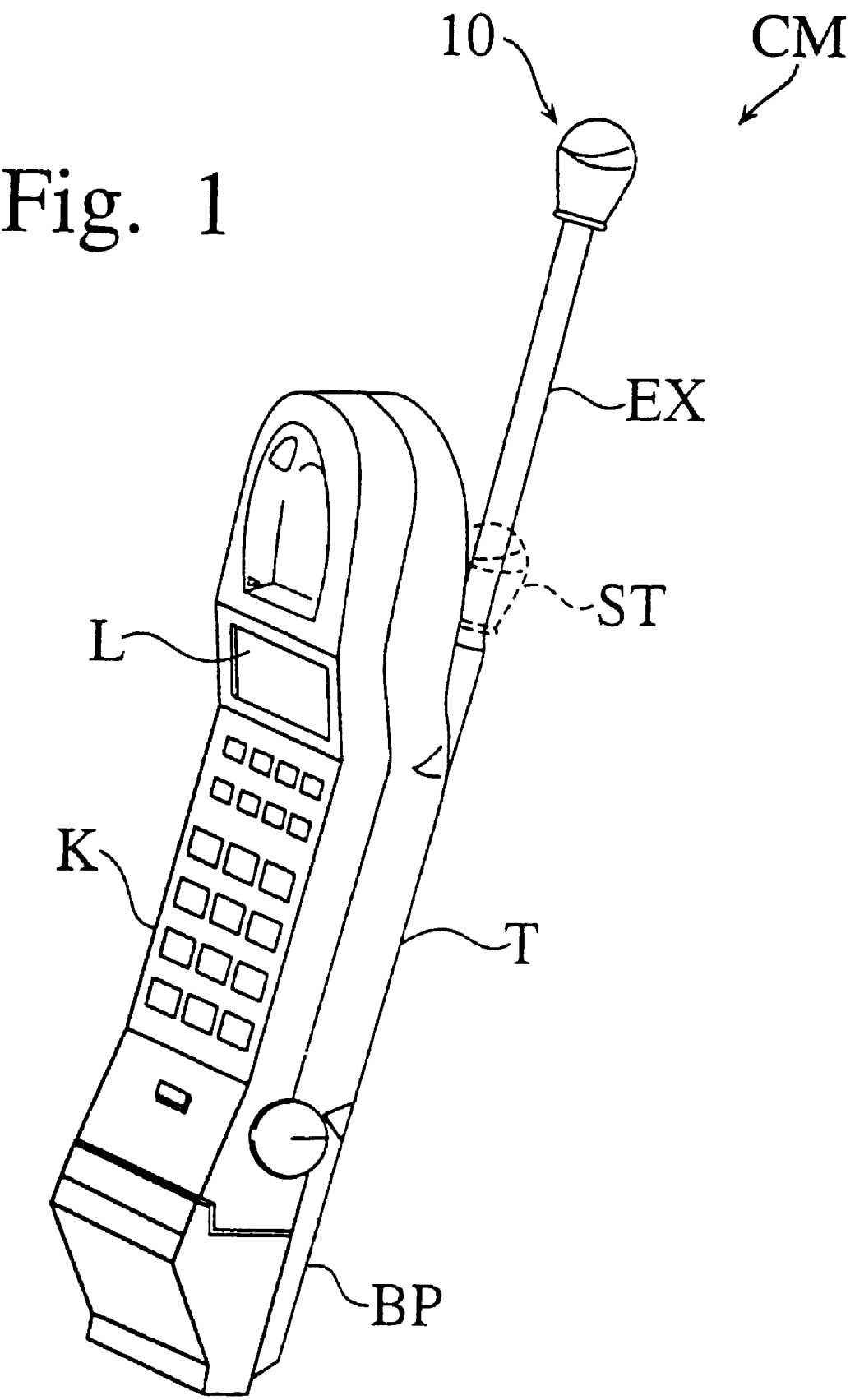

FIG. 1 illustrates a hand-held portable phone that includes a *Terrestrial Antenna* for a *Satellite Communication System*. In one of the preferred embodiments, a hemispherical millimeter wave antenna 10 is used in conjunction with a portable telephone T that includes an LCD display screen L, a keypad K, and a battery pack BP. In this version of a compact hand-held transceiver T, the antenna 10 is mounted on a collapsible mast CM, which is shown in both the extended and stowed positions, EX and ST.

FIGS. 2 and 3 exhibit top and side views of the invention 10A, which incorporates a generally trapezoidal housing. An inclined exterior surface 12 includes an upper and a lower portion 12A and 12B. This slanted ring 12 is attached to both a top circular surface 14 and a bottom circular surface 16. Both the side and top surfaces 12 and 14 provide support for a number of generally circular antenna elements 18. In FIGS. 2–6, only one of the elements 18 is shown in detail to simplify the drawing figures. An enlarged view of the element 18 is presented in FIG. 7. The patches 18 on the side 12 of the antenna 10A form an azimuth array, while those situated on the top 14 belong to an elevation array. These elements 18 utilize a conductive patch 20 bearing a cross-slot 22 that is formed from two individual perpendicular slots 22A and 22B. In one embodiment that is designed for use with the 20 Ghz band, the diameter of the top surface 14 is 1.5 inches (3.8 cm). The side surface 12 is 1.0 inch (2.5 cm) high, and the bottom surface 16 is 2.5 inches (6.4 cm) wide. The nominal gain of this embodiment is approximately 20 dB. For the 30 GHz band, the diameter of the radiating patches shrink to about seventy percent of the larger 20 GHz antenna patch. For a trapezoidal geometry where the ratio of the bottom 16 and top 14 surfaces is 5/3, beams emanated by this embodiment are capable of being steered electronically over 360 degrees in the azimuth plane and plus or minus 60 degrees in the elevation plane. This design provides for minimum performance degradation under several multipath environments. Active and passive microwave components are located within the housing attached to a ground plane. When used in this description and in the claims, the terms "azimuth" and "elevation" refer to the two dimensions in which beams are steered. The elevation dimension defines an angle EA measured from the local horizon from zero to ninety degrees. The azimuth dimension delineates the angle AA in the plane which is tangent to the surface of the Earth at the location of the antenna. The range of the azimuth angle is zero to three hundred and sixty degrees.

FIGS. 4 and 5 depict another embodiment of the invention 10B, which makes use of dual-frequency radiating elements located on the top of a hemispherical or dome-shaped surface. A hemispherical surface 24, which is mated to a bottom circular surface 26, is covered by antenna elements 18. The preferred embodiment of this configuration 10B utilizes a dome having a diameter of about 2.5 inches (1 cm). The nominal gain of the hemispherical antenna is about 20 dB over the desired range of scan angles. The printed circuit radiating elements, along with their integrated phase shifters, provide beam steering over 360 degrees in the azimuth plane and plus or minus 60 degrees in the elevation plane. The microstrip power dividers and combiners, impedance matching networks, amplitude taper elements and feed lines can be printed on the lower surface of the thin hemispherical surface using chemical etching techniques. Solid state phase shifters, along with their drivers and control circuits, can be located on a separate substrate and ground plane that are housed within the hemispherical enclosure. The hemispherical configuration furnished by this embodiment provides a microstrip conformal antenna built on a curved surface with a radius of curvature as small as 1.5 inches with minimal tensile and compressive stresses. The hemispherical configuration 10B experiences the minimum stretching forces under severe aerodynamic and environmental conditions. Due to its great mechanical integrity, the hemispherical embodiment 10B is well suited as an antenna which can be mounted on the nose of an aircraft or on other objects that travel at high speeds.

FIG. 6 shows a perspective view of an embodiment of the invention 10C that takes the shape of a right circular cylinder having a curved cylindrical surface 28, a top circular surface 30, and a bottom circular surface 32. Like the hemisphere 10B, the cylindrical antenna 10C has a nominal gain of 20 dB, and offers beam steering over 360 degrees in the azimuth plane and plus or minus 70 degrees in the elevation plane. For 20 GHz operation, this antenna is designed to measure three inches (7.6 cm) across and one inch (2.5 cm) high. A reduction of thirty to forty percent can be achieved if the 30 GHz frequency is utilized. The radiating elements 18 are arranged in parallel rows centered on the longitudinal axis of the cylinder. The elements 18 are spaced apart to meet the sidelobe and gain requirements of the azimuth array, and to minimize beam distortion and steering irregularities. Amplitude tapering and element spacing are also selected to provide low sidelobes over wide scan angles. The radiating elements 18 are electromagnetically coupled to their feed lines to provide optimum antenna performance.

FIGS. 7 and 8 supply detailed renditions of one of the circular antenna elements 18. FIG. 7 is a top view which includes a conductive patch layer 20 that has been milled, molded, or etched so that it bears two intersecting slots 22A and 22B. The resulting cross-slot 22 comprises two perpendicular slots which do not have equal lengths. The dissimilar lengths insure that the radiation emitted from the antenna 10 will be circularly polarized. FIG. 8 portrays a cross-section of element 18. A copper patch 20 that includes cross-slot 22 sits atop a nonconductive substrate layer 34, which resides above a ground plane layer 36. Each conductive patch 20 is 233 mils in diameter and from 0.25 to 1.00 mil thick.

FIGS. 9, 10, 11, 12 and 13 supply schematic diagrams of a five bit, time delay phase shifter 38. Each printed circuit delay line 40, 42, 44, 46, and 48 provides the necessary phase shift depending on the line length. In one embodiment of the invention, these lines 40, 42, 44, 46, and 48 provide phase shifts of 11.25, 22.50, 45.00, 90.00, and 180.00 degrees, respectively. The present invention utilizes these conductive pathways to select the appropriate delay for steering the antenna beams. Each antenna element 18 is coupled to its own phase shifter 38. The series-resonant printed circuit patch arrays are formed by connecting rows of patches through high impedance microstrip lines. The radiating patch elements are excited by low-loss microstrip lines arranged perpendicular to the resonant arrays. Each feed line will excite all the resonant arrays, forming a pencil beam in the broadside direction. The direction of the beam is steered by the low-loss, phase shifting elements with solid state switches located in the feed line. The present invention combines the phased array section and using a common aperture beamformer into a compact, low-loss, low-profile antenna structure.

Figure 14:
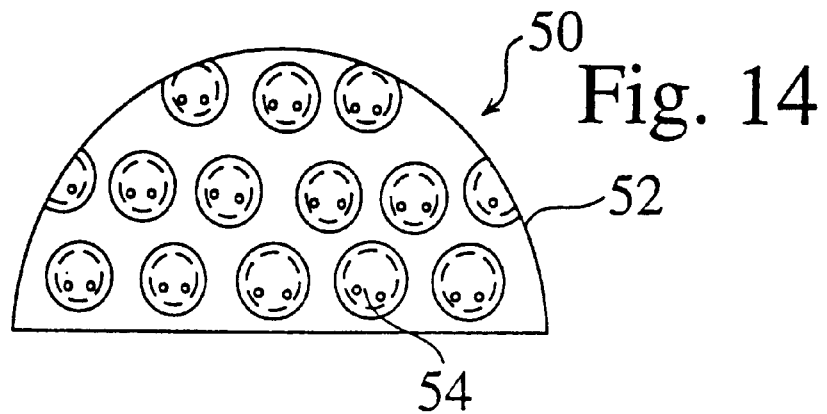
FIGS. 14 and 15 are side and top views of an alternate embodiment of the invention which incorporates dual frequency antenna elements.
Figure 15:
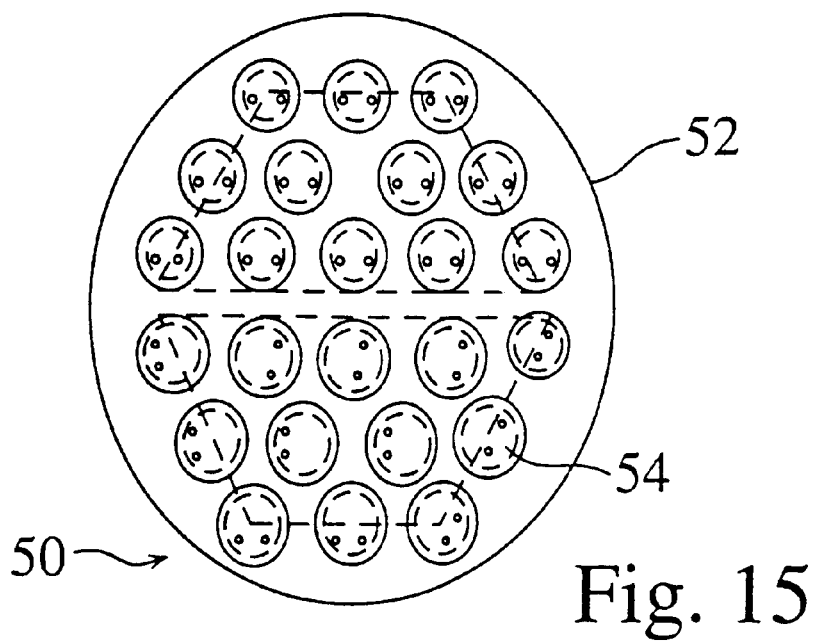
Figure 16:
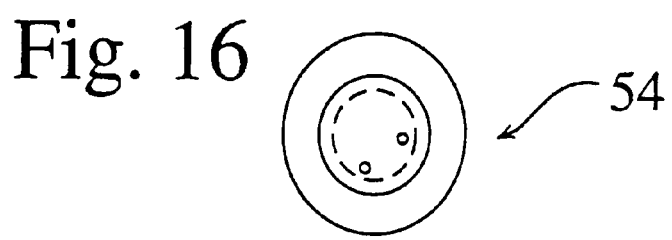
FIGS. 16 and 17 are top and cross-sectional views of one of the dual frequency antenna elements.
Figure 17:
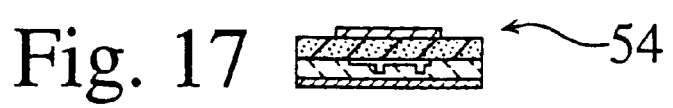
Figure 18:
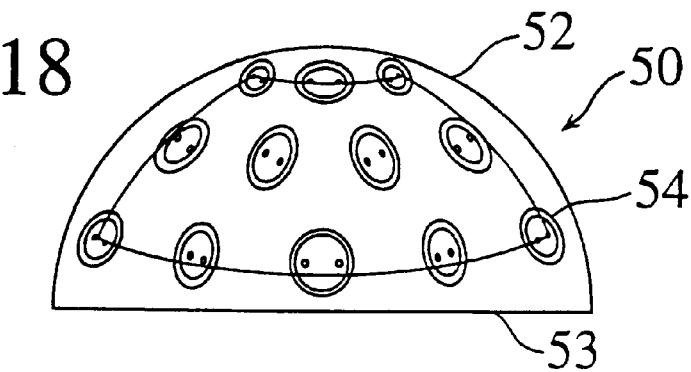
FIGS. 18 and 19 show enlarged side and top views of one of the alternative embodiments which incorporate the dual frequency antennas.
Figure 19:
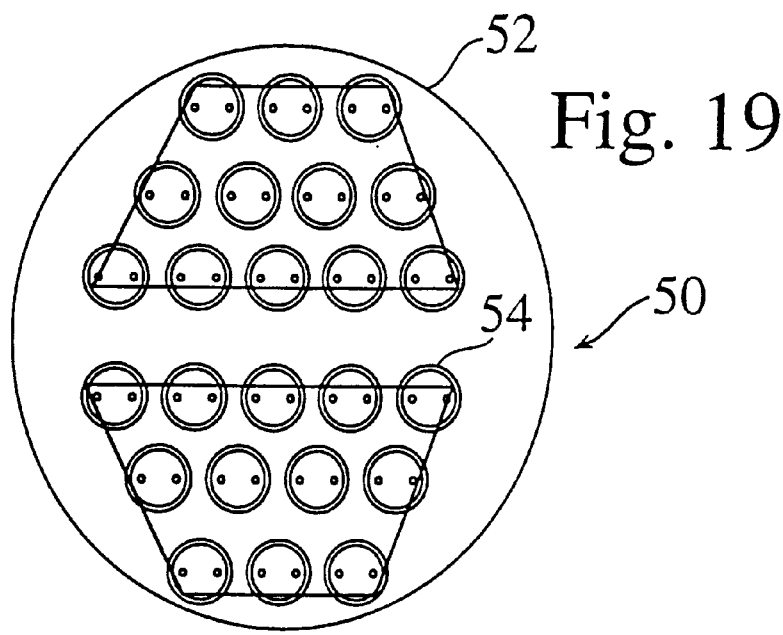
Figure 20:
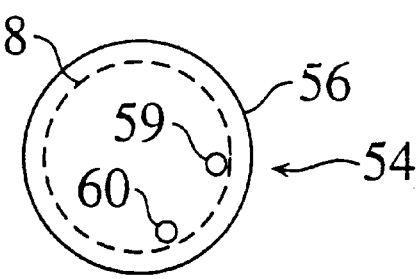
FIGS. 20 and 21 depict enlarged top and cross-sectional views of one of the dual frequency antenna elements.
Figure 21:
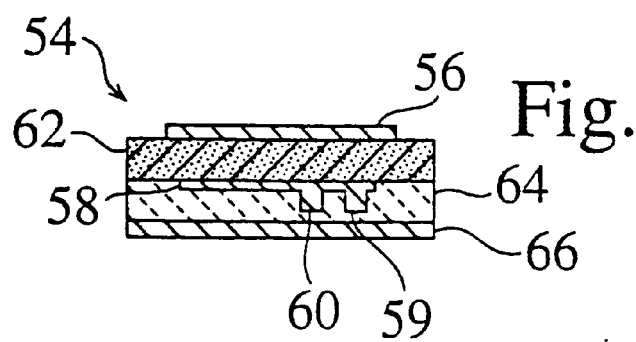

FIGS. 14 and 15 reveal side and top views of an alternate embodiment of the invention 50 which incorporates a hemispherical structure 52 covered by dual frequency antenna elements 54. FIGS. 16 and 17 show top and cross-sectional views of one of the dual frequency antennas 54. FIGS. 18 and 19 show enlarged side and top views of one of the alternative embodiments of the dual frequency antennas. The edge of lower circular surface 53 is visible in FIG. 18. FIGS. 20 and 21 show enlarged top and cross-sectional views of one of the dual frequency antenna elements 54 which includes an upper conductive layer 56, a lower conductive layer 58, and two conductive vias 59 and 60. The cross-sectional view in FIG. 21 also depicts a foam layer 62, a dielectric layer 64, and a ground plane layer 66. The radiating elements are printed on a high performance substrate. The feed networks and distribution circuits are printed on the lower side of the substrate. The active microwave components are located below the dielectric substrate. The entire antenna structure is secured to the ground plate 66.

FIGS. 22 and 23 reveal schematic block diagrams of the receive and transmit circuits 68 and 97 utilized in one of the several embodiments of the invention. The receive circuit 68 comprises a 20 GHz printed circuit four element subarray 70 which includes feeds 72. The feeds 72 convey signals to a first radio frequency (RF) amplifier 74, a first band pass filter (BPF) 76, a second RF amplifier 78, and a mixer 80. The mixer 80 combines the output of the second RF amplifier 78 and a source 82, which, in turn, receives the output of a synthesizer 84. The output of the mixer 80 is fed to a third RF amplifier 86 and to an intermediate frequency (IF) band pass filter (BPF) 90, an analog-to-digital (A/D) converter 92, a digital band pass filter (DBP) 94, and a threshold detector 96. A decoder 88 is connected to the output lead of RF amplifier 86. The transmit circuit 97 shown in FIG. 23 contains a 30 GHz printed circuit four element subarray 98 which has feeds 100 coupled to an amplifier 102, and encoder 104, an RF source 106 and a synthesizer 108.

FIGS. 24 and 25 depict side and top views of another embodiment 110 of the miniaturized antenna that is characterized by a top element 112, radiating elements 114, a soft substrate 115, a ground plane 116 and a dummy element 117. The radiating elements 114 are arranged in a hexagonal lattice pattern and are separated by approximately 0.075 inches (0.19 cm).

FIGS. 26, 27, 28 and 29 are plan and sectional views of dual frequency antennas. FIG. 26 exhibits a top view 118 of a 30 GHz printed circuit patch element 120 above a 20 GHz patch element 122. FIG. 27 shows the same hardware in a cross-sectional side view 126 that reveals the substrate layer 124 that separates the 30 GHz and 20 GHz elements 120 and 122, as well as a layer of foam 128 and a ground plane 130. FIG 28 shows a series of 30 and 20 GHz patch elements 120 and 122 residing together on a portion of an antenna. FIGS. 28 and 29 portray an alternative arrangement in which the active patches 120 and 122 are situated on either side of the substrate 124, as opposed to having element 122 embedded within substrate 124 as shown in FIG. 27.

FIGS. 30 and 31 show cross-sectional and plan views of an antenna with a hexagonal lattice. FIG. 30 comprises a cross-sectional view 132 that includes a radome 134 covering a dummy element 135, dual frequency printed circuit elements 136 and 137, a microwave substrate 138, feed networks and distribution circuits 140, active microwave components 142, and a ground plane and support structure 144. The top view 146 shown in FIG. 31 reveals an array of 20 and 30 GHz patches 136 and 137 deployed in a hexagonal lattice with the dummy element 135 at its center.

FIGS. 32 and 33 reveal side and top views of yet another embodiment 10D of the present invention comprising a generally hemispherical surface 148 coupled to a generally flat circular surface 150. The truncated hemispherical embodiment 10D includes a hemispherical array 152 and a top circular array 154 of dual frequency radiating elements 136. The hemispherical array 152 is affixed to a lower substrate 156 which resides above a ground plane 158. The top circular array 154 is covered by a dielectric radome 160.

The truncated hemispherical surface 148 is fabricated with an appropriate radius of curvature. The dual frequency radiating elements 136 are located on both the hemispherical surface 148 and on the top circular surface 150. This arrangement of radiating elements 136 provides electronic beam steering over 360 degrees in the azimuth plane, and over plus or minus 60 degrees in the elevation plane with minimum beam distortion. The printed circuit radiating elements 136 are located on the upper surface of a thin high performance substrate, while the feed lines, power dividers and combiners and impedance matching networks are located on the lower side of the thin substrate 150. The phase shifters, drivers and control networks are located on the lower substrate 156 above ground plane 158. All the circuits, except the radiating elements 136, are enclosed under and below the hemispherical surface 148.

The radiating elements 136 are formed using photo chemical-etching processes. In the preferred embodiments, the elements 136 are manufactured with tolerances not exceeding 0.0005" to meet the required RF performance levels. This antenna configuration will have a corporate feed that is capable of providing low VSWRs over all entire scan angles. The thickness of the lower substrate 156 containing the phase shifters, drivers and control networks is optimized to meet the specific RF performance requirements of the phased array antenna. The number of bits for the phase shifters is selected to satisfy the required sidelobe performance at a minimum cost and level of complexity. The protective radome 160 is made from a low-loss dielectric superstrate. The thickness of the radome 160 is selected to provide the needed mechanical strength and to maintain optimum RF performance over all desired scan angles. The radiating elements 136 are deployed in parallel rows centered about the vertical axis of the antenna 10D. This pattern of elements 136 rows supply the maximum gain in the azimuth plane, since a relatively large number of antenna elements 136 can be accommodated over the hemispherical surface 148 given its large radius of curvature. The printed circuit elements, microstrip feed lines, power dividers and matching networks are formed on a low-loss, printed circuit board with one half ounce copper on both sides using a chemical etching technique. The thickness of the thin substrate 150 is selected to achieve low sidelobes, low VSWRs and high radiation efficiency without generating higher order modes.

The truncated hemispherical embodiment 10D of the electronically steerable phased array antenna offers an extremely low-profile structure, high mechanical integrity, unrestricted field-of-view, improved reliability and minimum fabrication cost. In one of the preferred embodiments, the maximum diameter will be three inches and the overall height will not exceed one and one half inches. Since this embodiment offers a relatively large radius of curvature, a relatively large number of radiating elements 136 can be accommodated on the hemispherical surface 148 with minimum tensile and compressive forces.

The Terrestrial Antennas disclosed above may be used for voice or data communications. The portable transceiver unit T that incorporates the present invention 10 will provide a direct ground to satellite link (GSL) to a constellation of 840 spacecraft in low Earth orbit. The compact antennas 10 are designed to send and receive signals to satellites that are within a cone having a vertical axis that points toward the zenith which measures 80 degrees across. The angle from the terminal to the satellite, called the "mask angle," is sufficiently wide to insure that there are always at least two satellites in the constellation flying overhead to service portable units, but is also high enough above the horizon to virtually eliminate occultation by terrain, buildings, or trees. The 40 degree mask angle also limits the path length of the signal, protects link margins and thus reduces power requirements.

The constellation of spacecraft will be capable of offering continuous coverage between 70 degrees N and 70 degrees S latitude. Every satellite emanates 256 simultaneous beams, which are multiplexed to 4,096 positions. Regions on the ground which are illuminated by the radio beams from the satellite are called the "footprints" or "cells" that have hexagonal outlines and measure approximately 1400 km by 1400 km. Each individual beam illuminates a ground track of 20 km by 20 km and carries a pilot tone which identifies the source of each beam that enables the terrestrial transceiver to initiate contact with the orbiting network. Signal processing components residing in the spacecraft are responsible for electronically steering active antenna arrays on board each satellite. Every satellite controls the assignment of channels to terminals requesting services. When a terminal has more than one satellite in view, the satellites monitor the signal quality and select which one is best suited to handle the call to the terminal. Satellites measure the time delay and Doppler shift for each subscriber signal to determine the location of the ground unit within the beam footprint. The receive beam from the ground terminal lags the transmit beam emitted from the satellite by a fixed interval. The terminal transmits its data to the satellite at a delay specified by the satellite in its preceding scan. This method is used to compensate for delay differences caused by variations in path lengths. The scan pattern among beams is coordinated to insure that all cells being scanned at one instant are separated by sufficient distance to eliminate interference and cross-talk among customers using similar hand-held equipment.

Because the satellite antennas operate at a relatively high gain, the footprints on the ground are relatively small. The small cell sizes, combined with the rapid motion of the satellite footprint over the Earth's surface, means that a terminal remains in the same cell for only a few seconds. To avoid the rapid handoff from satellite to satellite every few seconds, an innovative logical/physical cell mapping scheme is utilized. For details about this novel technique, please refer to the copending patent application by Patterson and Sturza entitled *Beam Compensation Methods for Satellite Communication System*, which is cross-noted above. For optimal performance, the vertical axis of the antenna 10 should point at the zenith, but the beam steering capabilities of the antenna 10 can overcome the effects of using the transceiver T at different angles, as long as the signal from the portable phone remains pointed somewhere within the mask angle. If the orientation of the antenna 10 presents a problem for the subscriber, the hand-held unit can be connected to an external antenna which is mounted at a fixed angle or which is more sensitive. The low power design of the present invention substantially eliminates any radiation hazards.

The number of elements 18 which are deployed on the antennas 10 is directly proportional to the total gain achieved by the array. The number, N, for a hexagonal lattice is given by the expression:

$$N = \left(\left(1.5 * \frac{D}{\lambda}\right)\right)^2$$

where D is the aperture and $\lambda$ is the wavelength at the highest frequency. This expression indicates that about 61 elements having two inch (5.1 cm) aperture should be used for a frequency of 30 GHz. The appropriate phase shift, $\phi$, that is electronically selected to steer the beams using the various microstrip phase delay lines is determined by the following equation:

$$\phi = \frac{2\pi\lambda}{d}\sin\theta$$

where θ is the scan angle.

The design choices for the selection of materials is largely determined by the performance requirements that are encountered using the 20 GHz and the 30 GHz frequency bands. Three commercially available materials would be suitable for the substrates for the present invention. These include Rohacell rigid styrofoam material and Roger RT/5870 and RT/5880 materials, which are both glass microfiber-reinforced PTFE composite substrates. While Teflon fiberglass is an extremely rigid material, which is a desirable property for the substrate, its cost is nearly twice that of styrofoam. The dielectric constant, $e_r$, for each of these substrates ranges from 1.35 to 2.55. Although styrofoam is the least expensive material, it is far less rigid than either RT/5870 or RT/5880. One quarter ounce (8 grams) copper is used for the printed circuit antenna elements. The housing enclosure can be fabricated from a lightweight aluminum alloy.

Each of the embodiments disclosed above offers a low-profile structure that is relatively easy to fabricate. The fundamental design of these antennas is not restricted to the microwave frequencies, and may be also be used in phased array radar systems, direction finding systems and reconnaissance sensors.

Although the present invention has been described in detail with reference to a particular preferred embodiment, persons possessing ordinary skill in the art to which this invention pertains will appreciate that various modifications and enhancements may be made without departing from the spirit and scope of the claims that follow. The various orbital parameters and satellite population and configuration statistics that have been disclosed above are intended to educate the reader about one preferred embodiment, and are not intended to constrain the limits of the invention or the scope of the claims. The List of Reference Characters which follows is intended to provide the reader with a convenient means of identifying elements of the invention in the specification and drawings. This list is not intended to delineate or narrow the scope of the claims.

LIST OF REFERENCE CHARACTERS

| | |
|---|---|
| 10 | Terrestrial Antennas |
| 10A | Trapezoidal embodiment of antenna |
| 10B | Hemispherical embodiment of antenna |
| 10C | Cylindrical embodiment of antenna |
| 10D | Truncated hemispherical embodiment of antenna |
| 12 | Conical surface |
| 12A | Upper portion of conical surface |
| 12B | Lower portion of conical surface |
| 14 | Top circular surface |
| 16 | Bottom circular surface |
| 18 | Circular antenna element |
| 20 | Conductive patch |
| 22 | Cross-slots |
| 22A | First slot |
| 22B | Second slot |
| 24 | Hemispherical surface |
| 26 | Bottom circular surface |
| 28 | Cylindrical surface |
| 30 | Top circular surface |
| 32 | Bottom circular surface |
| 34 | Nonconductive substrate layer |
| 36 | Ground plane layer |
| 38 | Five bit, time delay phase shifter |

LIST OF REFERENCE CHARACTERS
-continued

| | |
|---|---|
| 40 | 11.25 degree delay line |
| 42 | 22.50 degree delay line |
| 44 | 45.00 degree delay line |
| 46 | 90.00 degree delay line |
| 48 | 180.00 degree delay line |
| 50 | Hemispherical configuration with dual frequency antenna elements |
| 52 | Upper hemispherical surface |
| 53 | Lower circular surface |
| 54 | Dual frequency antenna element |
| 56 | Upper conductive layer |
| 58 | Lower conductive layer |
| 59 | Conductive via |
| 60 | Conductive via |
| 62 | Foam layer |
| 64 | Dielectric layer |
| 66 | Ground plane layer |
| 68 | Receive circuit |
| 70 | Printed circuit four element subarray |
| 72 | Feeds |
| 74 | First radio frequency amplifier |
| 76 | First band pass filter |
| 78 | Second radio frequency amplifier |
| 80 | Mixer |
| 82 | Source |
| 84 | Output of synthesizer |
| 86 | Third radio frequency amplifier |
| 88 | Decoder |
| 90 | Intermediate frequency band pass filter |
| 92 | Analog-to-digital converter |
| 94 | Digital band pass filter |
| 96 | Threshold detector |
| 97 | Transmit circuit |
| 98 | Printed circuit four element subarray |
| 100 | Feeds |
| 102 | Amplifier |
| 104 | Encoder |
| 106 | Radio frequency source |
| 108 | Synthesizer |
| 110 | Alternate embodiment of miniaturized antenna |
| 112 | Top element |
| 114 | Radiating element |
| 115 | Soft substrate |
| 116 | Ground plane |
| 117 | Dummy element |
| 118 | Top view |
| 120 | 30 GHz printed circuit patch element |
| 122 | 20 GHz patch element |
| 124 | Substrate layer |
| 126 | Cross-sectional side view |
| 128 | Foam layer |
| 130 | Ground plane |
| 132 | Cross-sectional view |
| 134 | Radome |
| 135 | Dummy element |
| 136 | Printed dual frequency printed circuit elements |
| 137 | Printed dual frequency printed circuit elements |
| 138 | Microwave substrate |
| 140 | Feed networks and distribution circuits |
| 142 | Active microwave components |
| 144 | Ground plane and support structure |
| 146 | Top view of hexagonal array of dual frequency radiating elements |
| 148 | Hemispherical surface |
| 150 | Top flat circular substrate |
| 152 | Hemispherical array of dual frequency radiating elements |
| 154 | Top circular array of dual frequency radiating elements |
| 156 | Lower substrate |
| 158 | Ground plane |
| 160 | Radome |
| AA | Azimuth angle |
| BP | Battery pack |
| CM | Collapsible mast |
| EA | Elevation angles |
| EX | Retractable antenna mast in fully extended position |
| K | Keypad |
| L | LCD display screen |
| ST | Retractable antenna mast in stowed position |
| T | Telephone |

What is claimed is:

1. An apparatus for use with a satellite communication device which is capable of communicating directly with a satellite in Earth orbit comprising:

an antenna surface being generally hemispherical in shape and capable of transmitting and receiving radio beams to and from said satellite in Earth orbit;

said antenna surface being capable of steering radio beams in an azimuth dimension and in an elevation dimension; and a plurality of phased-array antenna elements disposed along said antenna surface, said phased-array elements each including upper and lower conducting surfaces separated by an insulating layer, said upper conducting surface being sized to operate at a first predetermined frequency and said lower conducting surface being sized to operate at a second predetermined frequency different from said first predetermined frequency.

2. An apparatus for use with a satellite communication device which is capable of communicating directly with a satellite in Earth orbit comprising:

an antenna surface capable of transmitting and receiving radio beams to and from said satellite in Earth orbit;

said antenna surface being capable of steering radio beams in an azimuth dimension and in an elevation dimension, wherein said antenna surface comprises first and second surface portions with said plurality of phased-array elements being disposed along said first and second surface portions, said first surface portion being generally planar and circular in shape, said second surface portion being generally trapezoidal in shape; and a plurality of phased-array antenna elements disposed along said antenna surface, said phased-array elements each including upper and lower conducting surfaces separated by an insulating layer, said upper conducting surface being sized to operate at a first predetermined frequency and said lower conducting surface being sized to operate at a second predetermined frequency different from said first predetermined frequency.

3. An apparatus for use with a satellite communication device which is capable of communicating directly with a satellite in Earth orbit comprising:

an antenna surface capable of transmitting and receiving radio beams to and from said satellite in Earth orbit;

said antenna surface being capable of steering radio beams in an azimuth dimension and in an elevation dimension, wherein said antenna surface comprises first and second surface portions with said plurality of phased-array elements being disposed along said first and second surface portions, said first surface portion being generally planar and circular in shape, said second surface portion being generally cylindrical in shape; and a plurality of phased-array antenna elements disposed along said antenna surface, said phased-array elements each including upper and lower conducting surfaces separated by an insulating layer, said upper conducting surface being sized to operate at a first predetermined frequency and said lower conducting surface being sized to operate at a second predetermined frequecny different from said first predetermined frequency.

4. An apparatus for use with a satellite communication device which is capable of communicating directly with a satellite in Earth orbit comprising:

a housing sized to be held by a hand of a user;

an antenna surface capable of transmitting and receiving radio beams to and from said satellite in Earth orbit;

said antenna surface being capable of steering radio beams in an azimuth dimension and in an elevation dimension;

a plurality of phased-array antenna elements disposed along said antenna surface, said phased-array elements each including upper and lower conducting surfaces separated by an insulating layer, said upper conducting surface being sized to operate at a first predetermined frequency and said lower conducting surface being sized to operate at a second predetermined frequency different from said first predetermined frequency.

a transmitter within said housing and coupled to at least a first portion of said plurality of phased-array elements;

a receiver within said housing and coupled to at least a second portion of said plurality of phased-array elements; and a power supply supported by said housing to provide electrical power to said transmitter and said receiver to thereby provide a hand-held portable satellite communication device.

5. The apparatus of claim 4, further including a collapsible mast having a proximal end coupled to said housing and a distal end displaced from said housing along a longitudinal axis of said mast, said antenna surface being attached to said mast at said distal end.

* * * * *

UNITED STATES PATENT AND TRADEMARK OFFICE
CERTIFICATE OF CORRECTION

PATENT NO. : 5,905,466
DATED : May 18, 1999
INVENTOR(S) : Asu Ram Jha

It is certified that error appears in the above-identified patent and that said Letters Patent is hereby corrected as shown below:

Title page item [22], delete "Jul. 8, 1997" and insert therefor --Jul. 7, 1997--.

Signed and Sealed this

Fifteenth Day of August, 2000

Attest:

Q. TODD DICKINSON

*Attesting Officer*  *Director of Patents and Trademarks*